United States Patent [19]
Pacholok et al.

[11] Patent Number: 5,594,320
[45] Date of Patent: Jan. 14, 1997

[54] CHARGE EQUALIZATION OF SERIES CONNECTED CELLS OR BATTERIES

[75] Inventors: David R. Pacholok, Sleepy Hollow, Ill.; David T. Fouchard, Madison; Walter B. Ebner, Lodi, both of Wis.

[73] Assignee: Rayovac Corporation, Madison, Wis.

[21] Appl. No.: 303,703

[22] Filed: Sep. 9, 1994

[51] Int. Cl.⁶ .................................................. H02J 7/00
[52] U.S. Cl. .................................. 320/4; 320/19; 320/21; 320/8
[58] Field of Search .................................. 320/4, 6, 8, 15, 320/19, 21

[56] References Cited

U.S. PATENT DOCUMENTS

| | | | |
|---|---|---|---|
| 4,079,303 | 3/1978 | Cox | 320/17 |
| 4,331,911 | 5/1982 | Park | 320/14 |
| 4,479,083 | 10/1984 | Sullivan | 320/6 |
| 4,684,814 | 8/1987 | Radomski | 290/31 |
| 5,003,244 | 3/1991 | Davis | 320/17 |
| 5,166,595 | 11/1992 | Leverich . | |
| 5,177,425 | 1/1993 | Goto | 320/6 |
| 5,479,083 | 12/1995 | Brainard | 320/2 |

FOREIGN PATENT DOCUMENTS

| | | |
|---|---|---|
| 0348983A2 | 1/1990 | European Pat. Off. . |
| 0432640A2 | 6/1991 | European Pat. Off. . |
| 0432639A3 | 6/1991 | European Pat. Off. . |
| 3940929C1 | 8/1991 | Germany . |
| 2-261024 | 10/1990 | Japan ................ H02J 7/34 |
| WO95/00978 | 1/1995 | WIPO . |

OTHER PUBLICATIONS

Heribert Schmidt et al., "The Charge Equalizer—A New System to Extend Battery Lifetime In Photovoltaic Systems, U.P.S. and Electric Vehicles," 15th INTELEC Conference, Paris, France, 1993, pp. 146–151.

Stephen T. Hung, et al., "Extension of Battery Life via Charge Equalization Control," IEEE Transactions on Industrial Electronics, vol. 40, No. 1, Feb. 1993, pp. 96–104.

David Fouchard, Walter Ebner, Sid Megahed, "Development of a Lithium–Ion BB–2847 Battery," Proceedings of the 36th Power Sources Conf., Cherry Hill, NJ, Jun. 6–9, 1994, p. 69, et seq.

Sony Corporation Battery Group & Sony Energytec, "Development and Commercialization of Lithium Ion Secondary Batteries," JEC Battery Newsletter, No. 4, Jul.–Aug. 1993, pp. 19–23 (with additional copy of the drawing on p. 23).

Communication from Linear Technology Corporation to Sid Megahed of Rayovac Corporation, entitled "Lithium Ion Battery Monitor," May 31, 1994.

Primary Examiner—Robert Nappi
Attorney, Agent, or Firm— Foley & Lardner

[57] ABSTRACT

An equalizer for equalizing the charge on several series-connected cells includes a transformer having plural windings on a core corresponding to the number of cells. The windings are tightly coupled to one another. A switching device such as a MOSFET is connected to each of the windings, and a winding and a switching device are connected across each of the cells. The switching devices are simultaneously switched at a relatively high frequency, e.g., 20 Hz, and the voltage across the highest charged cell appears across each of the windings when the switching devices are on. Current flows from the most highly charged cell to a cell or to cells of lower charge, with the charging current being proportional to the difference in voltage between the highest charged cell and each of the lesser charged cells. Equalization is carried out with very little power consumption by the equalizer, allowing charging to take place in a rapid manner.

21 Claims, 4 Drawing Sheets

5,594,320

CHARGE EQUALIZATION OF SERIES CONNECTED CELLS OR BATTERIES

This Invention was made with United States government support under U.S. Army research lab contract DAAL01-92-C-0221. The United States government has certain rights in this invention.

FIELD OF THE INVENTION

This invention relates generally to the field of battery charging and particularly to the charging of multiple cells or batteries connected in series.

BACKGROUND OF THE INVENTION

Each type of electrochemical cell has a characteristic "full charge" voltage. A lower cell voltage indicates a state of charge less than "full". To obtain a higher voltage than can be provided from a single cell, cells are connected in series, often with internal or integral connections between the cells, to form a battery which has the desired level of output voltage. Certain types of electrochemical cells, such as rechargeable alkaline manganese, lithium, and lithium ion cells have no internal charge control mechanism. Consequently, if charging of such cells is not carefully controlled, over-charge can result, which will cause irreversible changes in cell chemistry, performance loss, and, in extreme cases, cell venting. The charging of series connected cells of these types is therefore difficult, since cell voltages and capacities may not be equal, with the result that some cells are overcharged.

To address this problem, equalizers have been developed which monitor the voltage across each cell and connect resistors or current sinks across the cell or cells having an excessive voltage to partially discharge the cell and thereby accomplish charge equalization among the cells. However, equalizing the charge on cells in this manner wastes power and also causes undesirable heating of the battery pack since the equalization circuitry is typically physically located in the battery housing. In addition, the rate at which the cells can be equalized, and thus the rate at which the cells can be recharged, is limited to the amount of power dissipation that can be tolerated.

SUMMARY OF THE INVENTION

Equalization of charge on multiple series connected cells (or batteries) is accomplished in accordance with the present invention rapidly and substantially without unnecessary dissipation of power. Equalization is accomplished automatically without requiring comparison of voltages across individual cells or batteries (cell units) and can be and preferably is carried out during charging of the cell units. Further, the present invention provides current flow to a cell unit in proportion to the difference in the voltages between cell units, so that the lowest charged cell unit receives the greatest charging current from the highest charged cell unit while cell units at voltages intermediate the highest and lowest (where more than two cell units are being charged) receive lesser charge currents. Energy is transferred in this manner from the most highly charged cell unit to the cell unit or units having lesser charge.

The equalizer apparatus of the present invention includes a transformer having plural windings on a common core, with one winding for each of the cell units to be charged. All windings have the same number of turns and are tightly coupled to one another (preferably using multifilar wire) so that the leakage inductance of each winding is minimal. A controllable switching device is connected in series with each winding, and the series combination of each winding and switching device is connected in parallel across one of the cell units. An oscillator is connected to the switching devices to provide a control signal to each switching device to turn them on and off simultaneously at a high switching frequency. The switching frequency is preferably above the audible range, e.g., preferably 20 kHz or higher. A separate battery charger may simultaneously supply charging current to the series connected cell units.

When the switching devices are turned on, the voltages across all of the windings will be essentially the voltage across the most highly charged cell unit, from which current will flow into the transformer winding connected to that cell unit. Current will flow out of the windings connected to the lesser charged cell units, thus transferring energy from the most highly charged cell unit to the lesser charged cell units. Where more than two cell units are being charged, the current from the most highly charged cell is divided in the windings connected to the other cell units in proportion to the difference in voltage between the most highly charged cell unit and each of the other cell units.

Because control of power flow is carried out by switching elements which are either on or off, very little power loss occurs in the equalization circuit and very little heating of the components occurs. Consequently, equalization can be carried out at a very rapid rate compared to conventional equalization circuits, and the equalization is carried out with high energy efficiency. The high switching frequency is high enough and preferably beyond the audible range so that operation is substantially noiseless. Because the transfer of energy from the most highly charged cell unit to lesser charged cell units is carried out automatically by the inherent operation of the circuit, no complex voltage comparator circuits are required, minimizing the complexity and expense of the circuit. In addition, because no voltage measurements need be made, the present invention operates without regard to temperature and no compensation is required for temperature changes which may result in changes in cell unit voltages.

The equalizer of the invention may also include a second winding and a second switching device connected together in parallel with the first winding and first switching device for each of the cell units. An oscillator is connected to the first and second switching devices for each cell to turn them on and off alternately, so that when each of the first switching devices is turned on, the second switching devices are turned off, and conversely, when the second switching devices are turned on, the first switching devices are turned off. In this manner, charging current can be delivered from the most highly charged cell unit to the lesser charged cell unit during both halves of the switching cycle, allowing even more rapid equalization of the cell units, while making more efficient use of the B-H curve of the transformer core and allowing the transformer size to be reduced.

Further objects, features and advantages of the invention will be apparent from the following detailed description when taken in conjunction with the accompanying drawings.

DETAILED DESCRIPTION OF THE INVENTION

Figure 1:
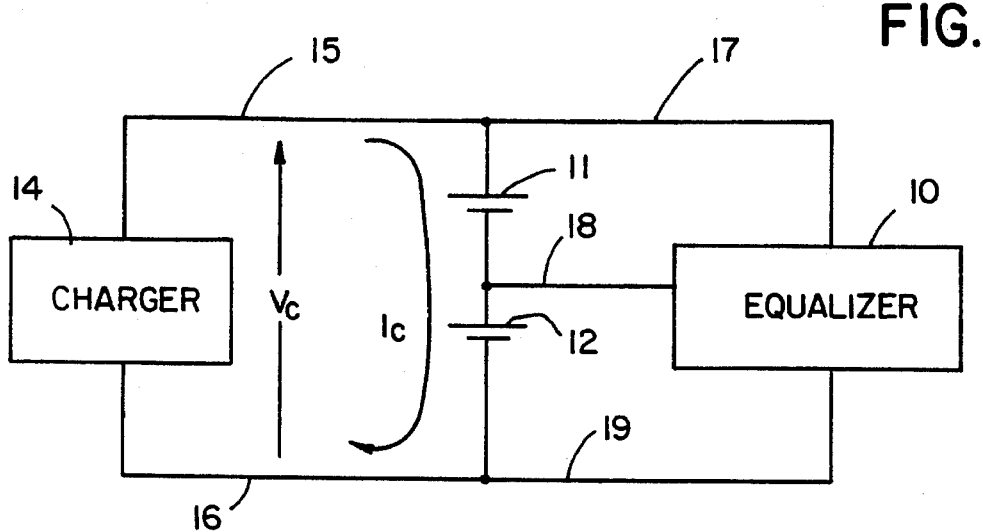
FIG. 1 is an illustrative block diagram of the equalizer of the present invention connected to provide equalization of two series-connected cell units being charged.

With reference to the drawings, a block diagram of a charging system is shown in FIG. 1 which includes the equalizer 10 of the present invention connected to two series connected electrochemical cell units 11 and 12. The cell units 11 and 12 may comprise various types of electrochemical cells, such as lithium-ion, rechargeable lithium, and rechargeable alkaline manganese batteries of the type commonly used in, e.g., cellular phones, videotape recorders and players, cameras, cordless tools, portable communications equipment, electric vehicles, and so forth. Although the problem is most acute for equalization of charge for individual cells of this type connected in series, the cell units 11 and 12 may comprise batteries of internally or externally connected cells where a requirement exists to properly equalize the charge across the two or more separable cell units. As used herein, the term "cell unit" is intended to refer both to single cells and to internally or externally connected batteries of cells. The illustrative charging system of FIG. 1 includes a charger 14 which supplies a charging current $I_c$ on connecting lines 15 and 16, with the charging current $I_c$ passing in series through the batteries 11 and 12. The charger 14 may be any type of conventional charger including constant current, float and trickle chargers, which are well known in the art. The output voltage of the charger 14, $V_c$, is applied across the series connected cell units 11 and 12. A connecting line 17 extends from the equalizer 10 to the positive terminal of the cell unit 11 and a connecting line 18 extends from the equalizer to the negative terminal of the cell unit 11 and to the positive terminal of the cell unit 12. Another connecting line 19 extends from the equalizer to connection to the negative terminal of the cell unit 12. Although the equalizer 10 is thus effectively connected in parallel with the cell units 11 and 12 across the charger 14, it draws substantially no power from the charger. The equalizer 10 of the invention may be utilized with various types of standard chargers which utilize various charging schemes, such as trickle chargers and constant current chargers, since the equalizer 10 does not draw significant power from the charger 14. It is also understood that the equalizer 10 may operate, if desired, when the charger 14 is not charging the cell units. As described further below, the equalizer 10 may be automatically actuated when the charger 14 supplies current to the cell units 11 and 12.

Figure 2:
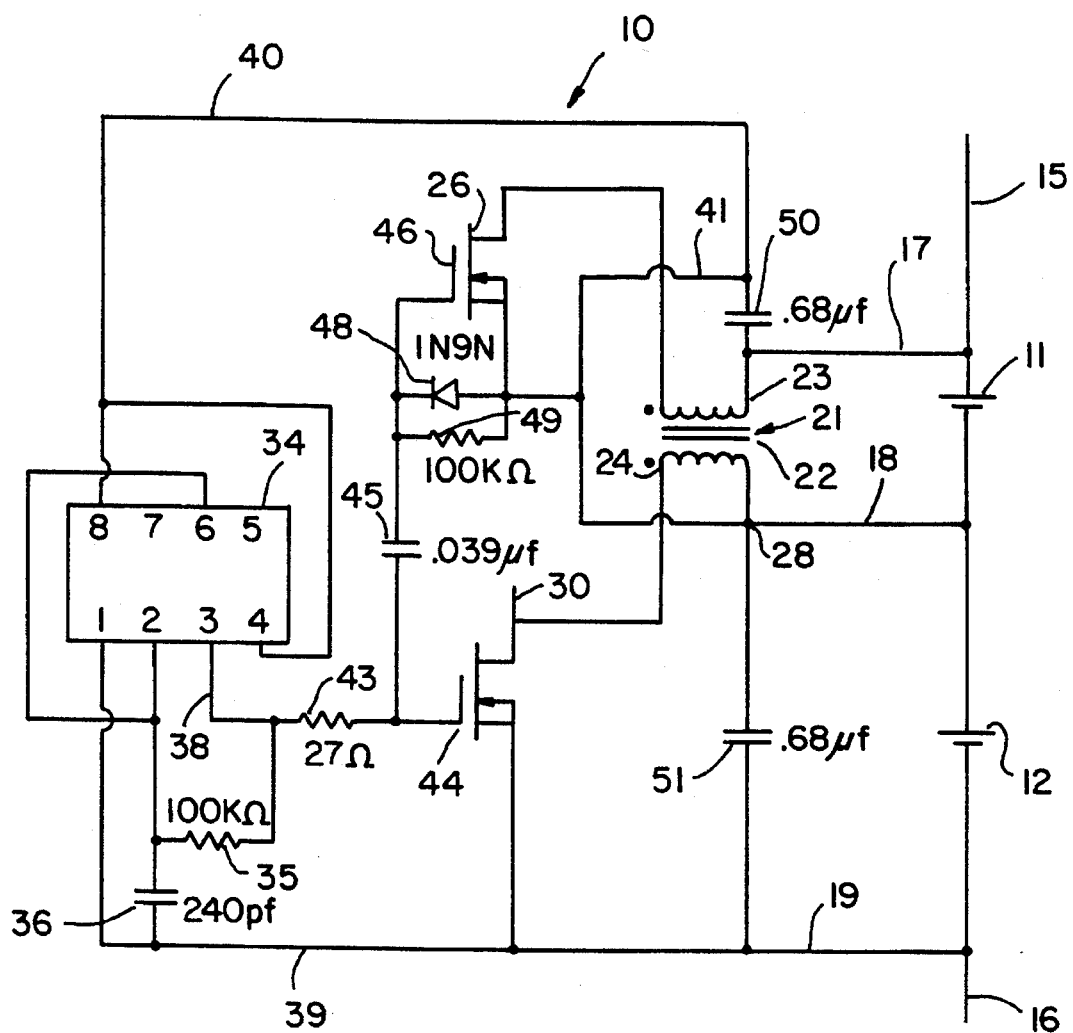
FIG. 2 is a schematic circuit diagram of an equalizer in accordance with the present invention for providing equalization of the charge to two cell units.

A schematic circuit diagram of an embodiment of the equalizer 10 for supplying the two cell units 11 and 12 is shown in FIG. 2. The equalizer 10 includes a transformer 21 having a core 22 about which is wound a winding 23 and a winding 24. The windings 23 and 24 are preferably formed of bifilar wires (e.g., No. 28 AWG wire) which are wound together on the core 22 with a very small gap (e.g., less than 0.001 inch). Because the windings 23 and 24 are formed of bifilar windings, each has an equal number of turns (e.g., 30 turns). The core 22 may be an E-core (e.g., 41205-EC, "J" material, available from Magnetic Devices, Inc. of Crystal Lake, Ill.; or 1408-3C8 POT Core). The winding 23 is connected to the line 17 leading to the positive terminal of the cell unit 11. One end of the winding 24 is connected by the line 18 to the negative terminal of the cell unit 11 and to the positive terminal of the cell unit 12. A controllable switching device 26 such as a power MOSFET (e.g., MTP25NO6L) is connected to the winding 23 and by a conducting line 27 to a node 28 to which the line 18 is connected. The series combination of the winding 23 and the switching device 26 is thus connected in parallel across the cell unit 11. Another switching device 30 is connected to the winding 24 and, by a line 31, to the line 19 leading to the negative terminal of the cell unit 12. Thus, the series combination of the winding 24 and the switching device 30 is connected in parallel across the cell unit 12. The controlled switching device 30 may also be a power MOSFET (e.g., MTP25NO6L).

An oscillator chip 34 (e.g., HA7555; TLC555) has a resistor 35 and a capacitor 36 connected thereto to provide a square-wave output signal on a line 38 at a desired frequency (for the values of resistances and capacitance shown in FIG. 2, at 25 kHz). A conducting line 39 is connected from the ground pin of the chip 34 to the line 31 and thus to the negative terminal of the cell unit 12, and line 40 is connected from the supply voltage pins of the chip 34 to a line 41 which is connected to the line 27, and thus to the positive terminal of the cell unit 12 to provide power to the chip 34. The square-wave output voltage signal on the line 38 from the chip 34 is provided (through a resistor 43) to the gate 44 of the MOSFET 30 and is coupled through a capacitor 45 to the gate 46 of the MOSFET 26. The capacitor 45 provides DC voltage isolation of the gates 44 and 46 while essentially passing the square-wave voltage signal from the chip 34 to the gate 46 so that substantially the same waveform is present at the gate 46 as at the gate 44. Consequently, the MOSFET's 26 and 30 are turned on and off simultaneously at the switching frequency of the oscillator 34. To maintain the gate 46 properly referenced to the source of the MOSFET 26, a paralleled diode 48 and resistor 49 are connected between the source and the gate 46. As shown in FIG. 2, a capacitor 50 may be connected between the line 17 leading to the positive terminal of the cell unit 11 and by the lines 41, 27 and 18 to the negative terminal of the cell unit 27, and a capacitor 51 may be similarly connected between the line 18 leading to the positive terminal of the cell unit 12 and a line 19 leading to the negative terminal of the cell unit 12, for snubbing purposes when the cells are at a substantial physical distance from the equalizer 10 and wiring inductance is a factor.

The oscillator 34 provides substantially a square-wave output signal to the gates 44 and 46 of the MOSFET switches 30 and 26, respectively. These switches are thus turned on and off simultaneously for approximately equal periods of time. When the switches are turned on, the voltages from the cell unit 11 will be imposed across the winding 23 and the voltage from the cell unit 12 will be imposed across the winding 24. Because the windings 23 and 24 have exactly the same number of turns and are tightly coupled, the voltage of the more highly charged cell unit, either the unit 11 or 12, will appear across both of the windings 23 and 24. For example, if the cell unit 11 is more highly charged than the cell unit 12, the voltage across the windings 23 and 24 will be the voltage of the cell unit 11, and current will flow through the cell unit 11 in a direction from the negative toward the positive terminal and through the winding 23, inducing a current in the winding 24 which will flow in a direction from the positive terminal to the negative terminal of the cell unit 12. Consequently, during the time that the switching devices 26 and 30 are on, energy will be transferred from the cell unit 11 to the cell unit 12. The level of current flow will be directly proportional to the difference between the voltages on the cell units 11 and 12. As the voltages of the two cell units approach one another, the level of current flow decreases and becomes substantially zero when the two cell units are equally charged. It is seen that any charging current $I_c$ flowing from the charger 14 will have no effect on this equalization since the charging current should substantially all flow through the relatively low resistance of the cell units 11 and 12 rather than through the windings 23 or 24.

Figure 3:
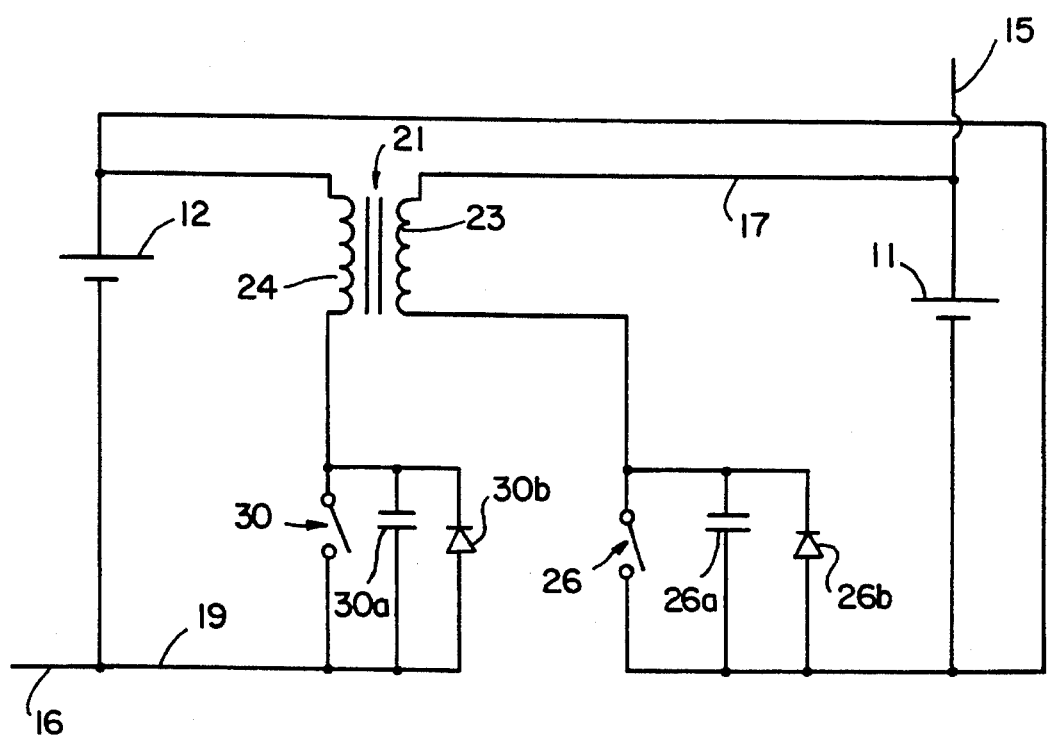
FIG. 3 is a simplified equivalent circuit for a portion of the equalizer of FIG. 2.

As any real transformer, the transformer 21 has some primary inductance in which energy is stored when the switches 26 and 30 are on. When the switches turn off, this energy must be released. Rather than being dissipated, this energy may be recovered and transferred back to the cell unit, as illustrated in FIG. 3 which shows simplified equivalent circuits for the MOSFET switches 26 and 30. The switch 26 has an effective drain to source capacitance 26a and a body diode 26b, and the switch 30 has a drain to source capacitance 30a and a body diode 30b. When the switches 26 and 30 are turned on, a current I flows from the cell 11 or 12 which has the highest voltage and the energy stored in the transformer inductance L is $\frac{1}{2} LI^2$. When the switches 26 and 30 are turned off, this energy is transferred to the capacitor 26a or 30a, with the energy stored in the capacitor being equal to $\frac{1}{2} CV^2$, where C is the capacitance of the capacitor and V is the voltage across the charged capacitor. By proper selection of the core, turns and gap of the transformer 21 to obtain a selected primary inductance L, and selection of the capacitance C of the switching devices 26 and 30, the resonant circuit formed by the transformer and the switching devices allows resonant energy recovery as long as the frequency of the switching, as controlled by the oscillator 34, is less than $\frac{1}{2\pi\sqrt{LC}}$.

Figure 4:
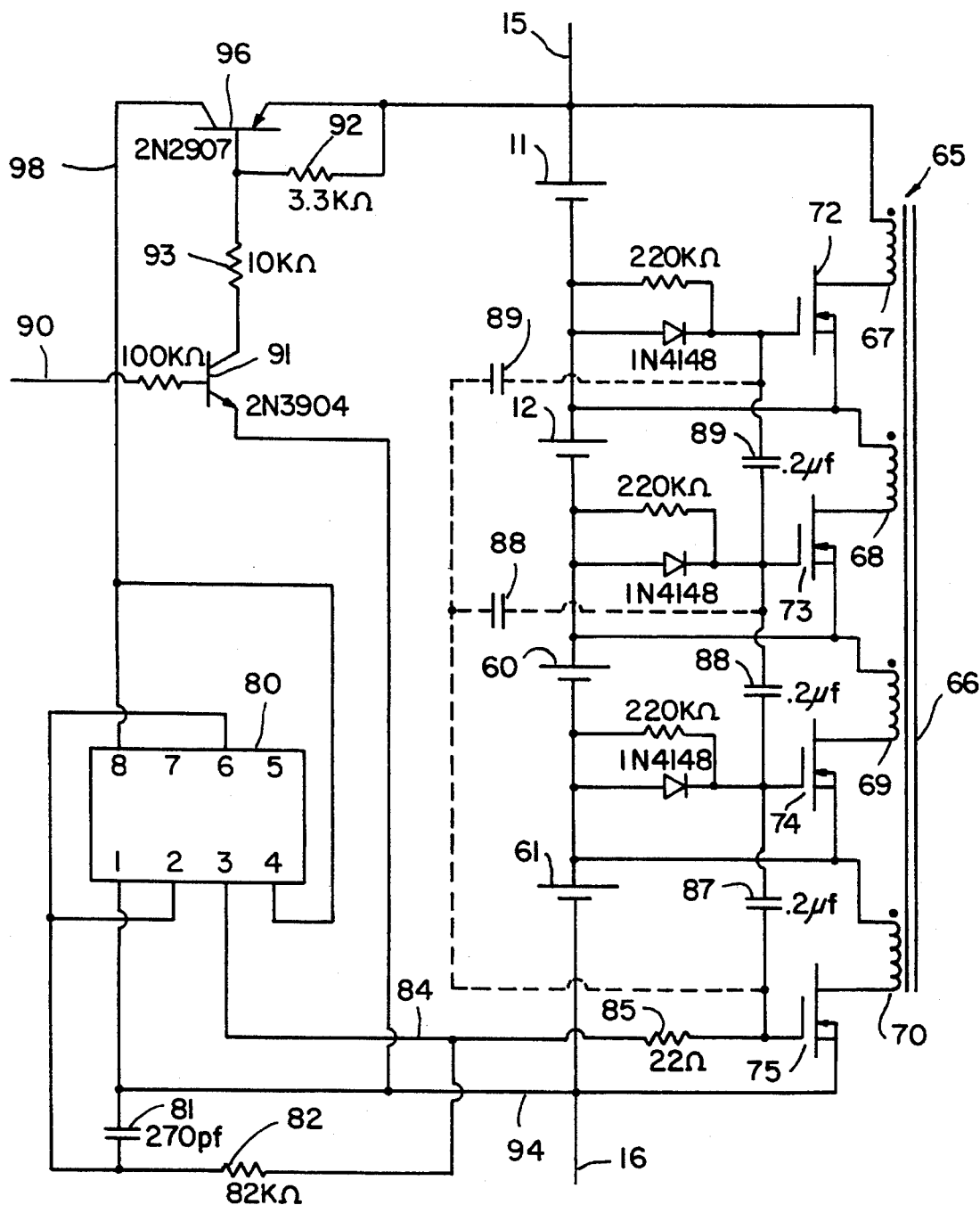
FIG. 4 is a schematic circuit diagram of an equalizer apparatus in accordance with the invention for providing equalization of the charge on more than two cell units.

The present invention may be extended to the equalization of more than two cell units, as illustrated in the schematic circuit diagram of FIG. 4. Here, in addition to the cell units 11 and 12, two additional cell units 60 and 61 are connected in series. A transformer 65 has a core 66 to which four windings 67, 68, 69 and 70 are wound. For example, the windings 67–70 may be quad-filar wound (e.g., No. 28 AWG wire, 28 turns) on a small gap core (e.g., 1408-3C8POT with a 0.0001 to 0.001 inch gap to prevent remanence caused core saturation). Four switching devices (e.g., MTP50H06EL MOSFETs) 72–75 are connected to the windings such that one of the switching devices is connected in series with one of the windings. Each series combination of winding and switching device is connected in parallel across one of the cell units, i.e., the winding 67 and switch 72 across the cell unit 11, the winding 68 and switch 73 across the cell unit 12, the winding 69 and switch 74 across the cell unit 60, and the winding 70 and switch 75 across the cell unit 61. An oscillator 80 (e.g., a CMOS 555 timer) has a capacitor 81 and resistor 82 connected to the pins thereof to select the frequency of oscillation of the oscillator 80, e.g., at 25 kHz. The square-wave output signal from the oscillator 80 is provided on a line 84 through a resistor 85 directly to the gate of the switching device 75 and through capacitors 87, 88 and 89 to the gates of the MOSFETs 74, 73 and 72. Alternative parallel connections for the capacitors 88 and 89 are shown in dashed lines in FIG. 4. Resistors and diodes are connected to the gates of the MOSFETs 72–74 for the reasons described above. When the switching devices 72–75 are turned on, the voltage appearing across each of the windings 67–70 will be the voltage across the most-highly charged cell unit 11, 12, 60 or 61. Thus, charging of the undercharged cell units will take place in proportion to the voltage difference between that cell unit and the most-highly charged cell unit.

It is preferable that the equalizer of the invention not be operating when charging is not taking place to maximize the shelf life of the battery. To turn off the equalizer, a signal may be provided on a line 90 extending to the base of a bipolar transistor 91. Resistors 92 and 93 are connected in series between the positive terminal of the cell unit 11 and the collector of the transistor 91, and the emitter of the transistor 91 is connected to a line 94 which is connected to the negative terminal of the cell unit 61. The junction between the resistors 92 and 93 is connected to the base of another bipolar transistor 96. When the voltage applied to the line 90 is at zero volts, the transistor 91 is off, as is the transistor 96. The transistor 96 is connected by a line 98 to the voltage supply inputs of the oscillator chip 80. Thus, in this state, no power is supplied to the oscillator 80, and it is turned off, applying no control signal to the gates of the MOSFETs 72–75. Since these are then off, no equalization current flows between the cell units 11, 12, 60 and 61. When the charger 14 is on, a high voltage is applied to the line 90, turning the transistors 91 and 96 on. Power is now supplied to the oscillator chip 80 so that it puts out a square-wave output signal to the gates of the switches 72–75. While the transistor 91 is on, a relatively small amount of power is dissipated in the resistors 92 and 93.

Figure 5:
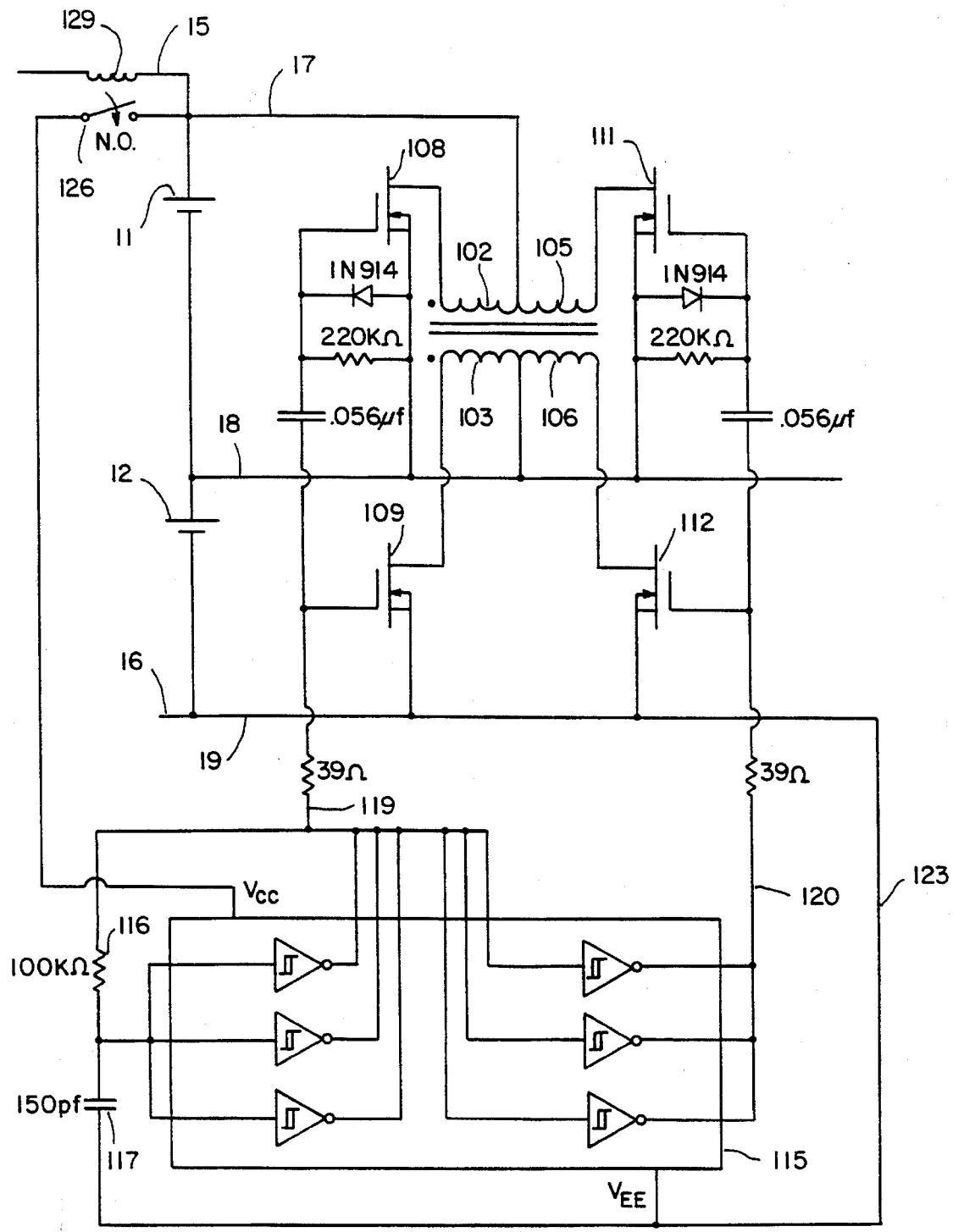
FIG. 5 is a schematic circuit diagram of an equalizer of the invention which is connected to two cell units to provide equalization current between the cell units during both halves of the switching cycle.

Another embodiment of the equalizer of the invention is shown in FIG. 5 which allows equalization current to flow during both halves of the switching cycle. The equalizer of FIG. 5 essentially uses two equalizer circuits as in FIGS. 2 or 4, each one operating on a different half of the switching cycle. The equalizer of FIG. 5 has a transformer 100 with a core 101 on which are wound first windings 102 and 103 which are bifilar windings. In addition, the transformer 100 also has second windings 105 and 106 which are bifilar windings. Preferably, the windings 102/103 and 105/106 all have the same number of turns (e.g., 20). A MOSFET switch 108 (e.g., MTP3055EL) is connected in series with the winding 102 across the cell unit 11. The winding 103 and a MOSFET switch 109 are connected across the cell unit 12. A MOSFET switch 111 is connected in series with the winding 105 across the cell unit 11, and a MOSFET switch 112 is connected in series with the winding 106 across the cell unit 12. The switches 108 and 109 may be considered together as the "first" switches and the switches 111 and 112 as the "second" switches. Additional cell units may be equalized by utilizing additional windings and switches in the manner shown in FIG. 4.

An IC chip 115 comprising a hex inverting Schmitt trigger circuit (e.g., CMOS 74C14) is biased with a resistor 116 and a capacitor 117 to act as an oscillator, putting out a square-wave signal at a selected frequency, e.g., 30 kHz. One of the outputs of the oscillator circuit 115 is a "non-inverted" output, and is connected to the gates of the MOSFETs 108 and 109, and another output of the circuit 115, connected to a line 120, is the "inverted" output and is provided to the gates of the MOSFETs 111 and 112. The signals on the lines 119 and 120 are the complements of one another. When the signal on the line 119 is "high", the signal on the line 120 is "low" and vice versa; thus, when the MOSFETs 108 and 109 are on, the MOSFETs 111 and 112 are off, and vice versa. When the MOSFETs 108 and 109 are on, the voltage across each of the windings 102 and 103 is the voltage of the more highly charged of the cell units 11 and 12, whereas when the MOSFETs 111 and 112 are on, the voltage across each of the windings 105 and 106 is the voltage across the more highly charged of the cell units 11 or 12. Thus, energy is transferred from the more highly charged to the less highly charged cell unit on both halves of the switching cycle, allowing more rapid equalization of the two cell units 11 and 12 than with the equalizer of FIG. 2. This arrangement also makes more efficient use of the B-H curve of the transformer core, which allows the size of the transformer to be reduced.

The oscillator 115 is provided with supply voltage from a line 122 which is connected to the positive terminal of the cell unit 11, while the negative terminal of the cell unit 12 is connected by a line 123 to the neutral or ground pin of the circuit 115. To allow control of the operation of the equalizer, a normally open relay switch 126 may be connected in the line 122 which is operated by a relay coil 127 connected in the line 15 from the charger 14. When current flows in the line 15 from the charger 14 to thereby energize the coil 129, the switch 126 is closed, supplying power to the oscillator IC 115, and thereby beginning switching of the MOSFETs 108, 109, 111 and 112. When the charger is off, and no current is flowing through the coil 129, the switch 126 is opened, so that all of the MOSFET switches are turned off and no power is drawn by the equalizer circuit.

It is understood that the invention is not confined to the particular embodiments set forth herein as illustrative, but embraces all forms thereof as come within the scope of the following claims.

What is claimed is:

1. An equalizer for equalizing the charge on two or more cell units connected in series comprising:
    (a) a transformer having plural windings on a core corresponding to the number of cell units, each of the windings having the same number of turns and being tightly coupled to one another;
    (b) a controllable switching device connected in series with each winding, each series combination of switching device and winding connectable in parallel across one of the cell units; and
    (c) an oscillator connected to the switching devices to provide a control signal to each switching device to turn each of the switching devices on and off simultaneously at a high switching frequency, whereby the voltage across each winding of the transformer will be the voltage of the cell unit having the highest voltage such that energy is transferred from the highest charged cell unit to one of lower charge.

2. The equalizer of claim 1 wherein the switching devices are power MOSFETs having gates, and wherein the oscillator is connected to supply the control signal to the gates to turn the MOSFETs on and off simultaneously.

3. The equalizer of claim 2 wherein the oscillator provides a square-wave output signal to the gates of the MOSFETs.

4. An equalizer for equalizing the charge on two or more cell units connected in series comprising:
    (a) a transformer having plural windings on a core corresponding to the number of cell units, each of the windings having the same number of turns and being tightly coupled to one another, and wherein the windings of the transformer have inductance;
    (b) a controllable switching device connected in series with each winding, each series combination of switching device and winding connectable in parallel across one of the cell units, and wherein the switching devices are power MOSFETs having gates and wherein each MOSFET has a drain to source capacitance which forms a resonant circuit with the winding to which the MOSFET is connected; and
    (c) an oscillator connected to the switching devices to provide a control signal at a switching frequency lower than a resonant frequency of the resonant circuit to the gates of each switching device to turn each of the switching devices on and off simultaneously at a high switching frequency, whereby the voltage across each winding of the transformer will be the voltage of the cell unit having the highest voltage such that energy is transferred from the highest charged cell unit to one of lower charge.

5. The equalizer of claim 1 wherein the oscillator switches at a switching frequency which is above an audible frequency.

6. The equalizer of claim 1 including means for turning off the oscillator when no current is being supplied by a battery charger to the cell units so that the switching devices are turned off and for turning on the oscillator and the switching devices when current is supplied from a battery charger to the cell units.

7. The equalizer of claim 6 in combination with a battery charger connected to supply charging current to the series combination of cell units.

8. The equalizer of claim 1 wherein the windings on the transformer are multifilar windings which are wound together on the core of the transformer having substantially no gap.

9. A method of equalizing the charge on two or more cell units connected in series, comprising the steps of:
    (a) providing a transformer having plural windings on a core corresponding to the number of cell units, each of the windings having the same number of turns and being tightly coupled to one another;
    (b) simultaneously electrically connecting each of the windings to one of the cell units for a selected period of time such that the voltage at the highest charged cell unit appears across each of the windings to transfer energy from the most highly charged cell unit to a cell unit of lower charge, and then simultaneously disconnecting the windings from the cell units, and repeating the steps of connecting and disconnecting the windings from the cell units at a selected frequency thereby to equalize the charge on the cell units.

10. The method of claim 9 wherein the step of connecting and disconnecting the windings to the cell units is carried out at a frequency above an audible frequency.

11. The method of claim 9 including the additional step of providing charging current through the cell units connected in series.

12. The method claim 9 wherein the step of connecting and disconnecting the windings is carried out only when charging current from a battery charger is supplied to the cell units.

13. A method of equalizing the charge on two or more cell units connected in series, comprising the steps of:
    (a) providing a transformer having two windings on a core for each cell unit, the two windings for each cell unit connected in parallel to such cell unit, the two windings for each cell unit comprising a first winding and a second winding, each of the first windings having the same number of turns and being tightly coupled to one another and each of the second windings having the same number of turns and being tightly coupled to one another; and (b) simultaneously electrically connecting each one of the first or second windings to one of the cell units for a selected period of time such that the voltage at the highest charged cell unit appears across each of the windings to transfer energy from the most highly charged cell unit to a cell unit of lower charge, and then simultaneously disconnecting the windings from the cell units, wherein the step of simultaneously electrically connecting and disconnecting is carried out alternatively for the first windings and then the second windings, and repeating the step of connecting and disconnecting the windings from the cell units at a selected frequency thereby to equalize the charge on the cell units.

14. An equalizer for equalizing the charge on two or more cell units connected in series comprising:

(a) a transformer having first and second windings on a core, the number of first and second windings corresponding to the number of cell units, each of the first windings having the same number of turns and being tightly coupled to one another and each of the second windings having the same number of turns and being tightly coupled to one another;

(b) a first controllable switching device connected in series with each first winding and a second controllable switching device connected in series with each second winding, each series combination of a first switching device and a first winding connectable in parallel with a series combination of a second switching device and a second winding across one of the cell units; and (c) an oscillator connected to the switching devices to provide a control signal to each switching device to turn each of the first switching devices on and off simultaneously and to turn each of the second switching devices on and off simultaneously at a high switching frequency, and wherein the second switching devices are off when the first switching devices are on and the second switching devices are on when the first switching devices are off, whereby the voltage across each winding of the transformer will be the voltage of the cell unit having the highest voltage such that energy is transferred from the highest charged cell unit to one of lower charge.

15. The equalizer of claim 14 wherein the first and second switching devices are power MOSFETs having gates and wherein the oscillator provides a noninverted output signal and an inverted output signal which is the complement of the noninverted output signal, the noninverted output signal connected to the gates of the first MOSFETs and the inverted output signal connected to the gates of the second MOSFETs.

16. The equalizer of claim 15 wherein the noninverted and inverted output signals of the oscillator are square-waves.

17. The equalizer of claim 15 wherein the windings of the transformer have inductance and each MOSFET has a drain to source capacitance which forms a resonant circuit with the winding to which the MOSFET is connected, and wherein the oscillator provides a control signal at a switching frequency lower than a resonant frequency of the resonant circuit.

18. The equalizer of claim 14 wherein the oscillator switches at a switching frequency which is above an audible frequency.

19. The equalizer of claim 14 including means for turning off the oscillator when no current is being supplied by a battery charger to the cell units so that the switching devices are turned off and for turning on the oscillator and the switching devices when current is supplied from a battery charger to the cell units.

20. The equalizer of claim 19 in combination with a battery charger connected to supply charging current to the series combination of cell units.

21. The equalizer of claim 14 wherein the first windings on the transformer are multifilar windings and the second windings are multifilar windings and wherein the multifilar windings are wound together on the core of the transformer having substantially no gap.

* * * * *